(12) United States Patent
Davis

(10) Patent No.: US 12,281,931 B2
(45) Date of Patent: Apr. 22, 2025

(54) HUMAN ACTIVITY CLASSIFICATION AND IDENTIFICATION USING STRUCTURAL VIBRATIONS

(71) Applicant: Benjamin T. Davis, Columbia, SC (US)

(72) Inventor: Benjamin T. Davis, Columbia, SC (US)

( * ) Notice: Subject to any disclaimer, the term of this patent is extended or adjusted under 35 U.S.C. 154(b) by 90 days.

(21) Appl. No.: 16/713,564

(22) Filed: Dec. 13, 2019

(65) Prior Publication Data
US 2020/0191643 A1 Jun. 18, 2020

Related U.S. Application Data

(60) Provisional application No. 62/779,045, filed on Dec. 13, 2018.

(51) Int. Cl.
*G01H 1/00* (2006.01)
*G06N 20/00* (2019.01)

(52) U.S. Cl.
CPC ............... *G01H 1/00* (2013.01); *G06N 20/00* (2019.01)

(58) Field of Classification Search
CPC .................................. G01H 1/00; G06N 20/00
See application file for complete search history.

(56) References Cited

U.S. PATENT DOCUMENTS

| | | |
|---|---|---|
| 3,759,085 A | 9/1973 | Wilson et al. |
| 4,870,868 A | 10/1989 | Gastgeb et al. |
| 7,430,914 B2 | 10/2008 | Mitchell et al. |
| 8,577,555 B2 | 11/2013 | Kula et al. |
| 8,948,961 B2 | 2/2015 | Mack et al. |
| 9,364,748 B2 | 6/2016 | Rabin et al. |
| 9,453,759 B2 | 9/2016 | Höfelsauer et al. |
| 9,489,777 B2 | 11/2016 | Meir et al. |
| 9,775,520 B2 * | 10/2017 | Tran .................. G08B 21/0492 |
| 9,827,935 B2 | 11/2017 | Le et al. |
| 10,725,439 B2 * | 7/2020 | Kozionov ............. G05D 19/02 |
| 2009/0224925 A1 * | 9/2009 | Gannot ................ G08B 29/183 340/573.1 |
| 2010/0027378 A1 * | 2/2010 | Sabatier ............. G08B 13/1672 367/136 |
| 2015/0377694 A1 | 12/2015 | Shepard, Jr. et al. |
| 2017/0096117 A1 | 4/2017 | Joga et al. |
| 2017/0301207 A1 | 10/2017 | Davis et al. |
| 2018/0053102 A1 * | 2/2018 | Martinson .......... G08G 1/09623 |
| 2018/0064397 A1 * | 3/2018 | Horikawa ............ A61B 5/7267 |
| 2018/0150738 A1 * | 5/2018 | Harvey ................. G06K 19/14 |
| 2018/0357525 A1 * | 12/2018 | Harvey ................. G06V 40/25 |
| 2019/0117125 A1 * | 4/2019 | Zhang .................. A61B 5/1117 |

FOREIGN PATENT DOCUMENTS

| | | | |
|---|---|---|---|
| CN | 107631867 A | * 1/2018 | |
| CN | 106482638 | 11/2018 | |
| TW | 96105466 A | * 2/2007 | ............. G10K 11/16 |

* cited by examiner

*Primary Examiner* — Lina Cordero
(74) *Attorney, Agent, or Firm* — Offit Kurman; Douglas L. Lineberry

(57) ABSTRACT

The current disclosure is directed to classifying/identifying an action based on the vibrations caused in/on/around a structure by the action and providing a confidence level association between the vibration and the action that caused the vibration.

14 Claims, 27 Drawing Sheets

Table 1: Activity Types

| Name | Type | Weight | Drop Height |
|---|---|---|---|
| baglow | bag of K'Nex | 0.45 kg (0.99 lb) | 1.42 m (4.63 ft) |
| baghigh | bag of K'Nex | 0.45 kg (0.99 lb) | 2.10 m (6.89 ft) |
| baglow | basketball | 0.56 kg (1.23 lb) | 1.42 m (4.63 ft) |
| ballhigh | basketball | 0.56 kg (1.23 lb) | 2.10 m (6.89 ft) |
| djump | male | 80 kg (176 lb) | - |
| jjump | female | 55 kg (121 lb) | - |
| wjump | male | 85 kg (187 lb) | - |

FIGURE 4

Table 2: Classification and Identification Types

| Classification | Identification |
|---|---|
| bag | baglow, baghigh |
| ball | balllow, ballhigh |
| jump | djump, jjump, wjump |

FIGURE 5

Table 3: SVM Top 22 Classification Metric Combination Scores (Layer One)

| Metrics | Classification Accuracy | Identification Accuracy |
|---|---|---|
| MA, SE | 95.8% | 71.6% |
| MA, SE, ZCR, PPTI | 95.4% | 64.0% |
| MA, SE, ZCR | 95.2% | 74.0% |
| MA, D, SE, ZCR | 94.8% | 71.7% |
| MA, D, ZCR | 94.7% | 71.2% |
| MA, D, SE | 94.3% | 67.3% |
| MA, D | 94.0% | 66.3% |
| MA, SE, PPTI | 93.6% | 64.3% |
| D, SE, ZCR | 93.5% | 67.1% |
| MA, SE, ZCR | 93.4% | 60.1% |
| SE, ZCR, PPTI | 93.1% | 59.1% |
| MA, ZCR | 93.1% | 71.1% |
| MA, D, ZCR, PPTI | 92.9% | 59.5% |
| MA, D, SE, ZCR, PPTI | 92.9% | 60.4% |
| SE, ZCR | 92.6% | 68.2% |
| D, ZCR | 92.1% | 64.4% |
| D, SE, ZCR, PPTI | 91.5% | 58.7% |
| D, ZCR, PPTI | 91.4% | 58.1% |
| ZCR, PPTI | 91.1% | 53.4% |
| D, SE | 90.5% | 57.5% |
| MA, D, SE, PPTI | 90.5% | 59.7% |
| SE | 90.3% | 63.5% |

FIGURE 6

Table 4: SVM Top 22 Identification Metric Combination Scores (Layer Two)

| L1 Metrics | L2 Metrics | Classification Accuracy | Identification Accuracy |
|---|---|---|---|
| MA, SE, ZCR | MA, SE, ZCR | 95.2% | 74.1% |
| MA, SE, ZCR, PPTI | MA, SE, ZCR | 95.4% | 73.9% |
| MA, SE | MA, SE, ZCR | 95.8% | 73.9% |
| MA, D, SE, ZCR | MA, SE, ZCR | 94.8% | 73.8% |
| MA, D, ZCR | MA, SE, ZCR | 94.7% | 73.8% |
| MA, D, SE | MA, SE, ZCR | 94.3% | 73.1% |
| MA, SE, PPTI | MA, SE, ZCR | 93.6% | 73.0% |
| MA, D | MA, SE, ZCR | 94.0% | 72.9% |
| D, SE, ZCR | MA, SE, ZCR | 93.5% | 72.9% |
| SE, ZCR, PPTI | MA, SE, ZCR | 93.1% | 72.9% |
| MA, ZCR | MA, SE, ZCR | 93.1% | 72.5% |
| MA, SE, ZCR | MA, ZCR | 95.2% | 72.4% |
| MA, ZCR, F | MA, SE, ZCR | 93.4% | 72.2% |
| MA, D, ZCR | MA, ZCR | 94.7% | 72.1% |
| MA, D, SE, ZCR | MA, ZCR | 94.8% | 72.1% |
| MA, D, SE, ZCR, PPTI | MA, SE, ZCR | 92.9% | 72.1% |
| MA, D, ZCR, PPTI | MA, SE, ZCR | 92.9% | 72.0% |
| SE, ZCR | MA, SE, ZCR | 92.6% | 71.9% |
| MA, SE, ZCR, PPTI | MA, ZCR | 95.4% | 71.9% |
| MA, SE | MA, ZCR | 95.8% | 71.9% |
| MA, SE | MA, D, SE, ZCR | 95.8% | 71.8% |
| D, ZCR | MA, SE, ZCR | 92.1% | 71.7% |

FIGURE 7

Table 5: MLR Top 22 Classification Metric Combination Scores (Layer One)

| Metrics | Classification Accuracy | Identification Accuracy |
|---|---|---|
| SE | 97.3% | 70.6% |
| MA, SE, ZCR, MJ | 95.5% | 72.8% |
| MA, D, SE, ZCR, MJ | 95.2% | 72.8% |
| MA, SE | 95.1% | 73.6% |
| MA, D, SE, ZCR | 95.0% | 74.4% |
| SE, ZCR | 94.6% | 72.3% |
| MA, D, SE | 94.5% | 71.5% |
| D, SE, ZCR, MJ | 94.3% | 72.3% |
| MA, SE, ZCR | 94.3% | 74.4% |
| D, SE, ZCR | 94.2% | 71.1% |
| MA, D, ZCR, MJ | 94.1% | 72.5% |
| SE, ZCR, MJ | 93.9% | 70.1% |
| MA, D, ZCR | 93.1% | 71.5% |
| MA, ZCR, MJ | 93.0% | 69.2% |
| D, ZCR, MJ | 93.0% | 70.8% |
| MA, D, SE, MJ | 92.7% | 69.6% |
| MA, ZCR | 92.4% | 69.0% |
| MA, SE, MJ | 92.0% | 69.9% |
| D, SE | 91.9% | 65.8% |
| MA, D, MJ | 91.8% | 66.5% |
| ZCR, MJ | 91.7% | 66.4% |
| D, ZCR, PPTI, F, MJ | 91.7% | 63.9% |

FIGURE 8

Table 6: MLR Top 22 Identification Metric Combination Scores (Layer Two)

| L1 Metrics | L2 Metrics | Classification Accuracy | Identification Accuracy |
|---|---|---|---|
| SE | MA, D, SE, ZCR | 97.3% | 79.4% |
| MA, SE | MA, D, SE, ZCR | 95.1% | 78.5% |
| SE | MA, D, ZCR | 97.3% | 78.4% |
| SE | D, SE, ZCR | 97.3% | 78.2% |
| SE | MA, SE, ZCR | 97.3% | 78.1% |
| MA, D, SE, ZCR | MA, D, SE, ZCR | 95.0% | 78.1% |
| MA, D, SE | MA, D, SE, ZCR | 94.5% | 78.0% |
| MA, SE, ZCR, MJ | MA, D, SE, ZCR | 95.5% | 77.7% |
| SE | MA, D, SE, ZCR, MJ | 97.3% | 77.5% |
| MA, SE, ZCR | MA, D, SE, ZCR | 94.3% | 77.5% |
| SE | MA, D, ZCR, MJ | 97.3% | 77.4% |
| MA, SE | MA, D, ZCR | 95.1% | 77.4% |
| MA, D, SE, ZCR, MJ | MA, D, SE, ZCR | 95.2% | 77.4% |
| SE | MA, ZCR, F, MJ | 97.3% | 77.3% |
| SE | D, SE, ZCR, F, MJ | 97.3% | 77.3% |
| MA, SE | MA, SE, ZCR | 95.1% | 77.3% |
| SE | D, SE, ZCR, MJ | 97.3% | 77.3% |
| SE | D, ZCR, F, MJ | 97.3% | 77.3% |
| SE | MA, D, SE, ZCR, F, MJ | 97.3% | 77.2% |
| SE | SE, ZCR | 97.3% | 77.2% |
| MA, SE | D, SE, ZCR | 95.1% | 77.1% |
| MA, D, SE, ZCR | MA, D, ZCR | 95.0% | 77.1% |
| SE | MA, D, ZCR, F, MJ | 97.3% | 77.1% |

FIGURE 9

Table 7: SVM Top 20 Classification Metric Combination Scores for Layer One Assuming an Unknown Location

| Metrics | Classification Accuracy | Identification Accuracy |
|---|---|---|
| MA, SE | 97.6% | 69.9% |
| MA, SE, ZCR | 96.4% | 71.3% |
| MA, D, SE, ZCR | 95.9% | 70.8% |
| MA, D, SE | 95.7% | 67.0% |
| MA, D, ZCR | 95.1% | 69.8% |
| MA, D, SE, ZCR, PPTI | 94.0% | 64.0% |
| MA, D | 93.8% | 64.5% |
| MA, D, ZCR, PPTI | 92.9% | 62.7% |
| NA, SE, ZCR, PPTI | 92.9% | 64.0% |
| MA, D, SE, PPTI | 92.3% | 60.7% |
| D, SE, ZCR, PPTI | 91.7% | 60.0% |
| D, SE, ZCR | 91.4% | 64.0% |
| MA, SE, PPTI | 90.7% | 61.0% |
| SE, ZCR, PPTI | 90.7% | 57.0% |
| D, ZCR, PPTI | 90.4% | 58.1% |
| MA, D, PPTI | 90.3% | 59.5% |
| MA, ZCR, PPTI | 89.7% | 60.6% |
| SE | 88.9% | 54.8% |
| D, ZCR | 88.7% | 59.8% |
| ZCR, PPTI | 88.3% | 51.2% |

FIGURE 11

Table 8: SVM Top 20 Classification Metric Combination Scores for Layer Two Assuming an Unknown Location

| L1 Metrics | L2 Metrics | Classification Accuracy | Identification Accuracy |
|---|---|---|---|
| MA, SE | MA, SE, ZCR | 97.6% | 73.4% |
| MA, SE | MA, D, SE, ZCR | 97.6% | 73.0% |
| MA, SE | MA, D, ZCR | 97.6% | 72.7% |
| MA, SE, ZCR | MA, SE, ZCR | 96.4% | 72.3% |
| MA, SE | MA, ZCR | 97.6% | 72.1% |
| MA, SE, ZCR | MA, D, SE, ZCR | 96.4% | 71.9% |
| MA, D, SE, ZCR | MA, SE, ZCR | 95.9% | 71.8% |
| MA, SE, ZCR | MA, D, ZCR | 96.4% | 71.7% |
| MA, D, ZCR | MA, SE, ZCR | 95.7% | 71.4% |
| MA, D, SE, ZCR | MA, D, SE, ZCR | 95.9% | 71.3% |
| MA, D, ZCR | MA, SE, ZCR | 95.1% | 71.2% |
| MA, D, SE, ZCR | MA, D, ZCR | 95.9% | 71.1% |
| MA, SE, ZCR | MA, ZCR | 96.4% | 71.0% |
| MA, D, SE | MA, D, SE, ZCR | 95.7% | 70.8% |
| MA, D, ZCR | MA, D, SE, ZCR | 95.1% | 70.7% |
| MA, D, SE | MA, D, ZCR | 95.7% | 70.6% |
| MA, D, ZCR | MA, D, ZCR | 95.1% | 70.6% |
| MA, D, SE, ZCR, PPTI | MA, SE, ZCR | 94.0% | 70.5% |
| MA, D, SE, ZCR | MA, ZCR | 95.9% | 70.5% |
| MA, SE, ZCR, PPTI | MA, SE, ZCR | 92.9% | 70.2% |

FIGURE 12

Table 9: MLR Top 20 Classification Metric Combination Scores for Layer One Assuming an Unknown Location

| Metrics | Classification Accuracy | Identification Accuracy |
|---|---|---|
| MA, SE | 94.8% | 66.4% |
| MA, D, SE | 92.7% | 61.7% |
| MA, SE, ZCR | 92.1% | 64.0% |
| MA, D, SE, ZCR | 92.0% | 62.0% |
| MA, SE, MJ | 91.9% | 67.3% |
| PPTI, F, MJ | 90.5% | 57.6% |
| MA, PPTI, F, MJ | 90.5% | 57.0% |
| SE, PPTI, F, MJ | 90.5% | 57.6% |
| MA, SE, PPTI, F, MJ | 90.5% | 57.6% |
| ZCR, PPTI, F, MJ | 90.5% | 57.5% |
| MA, ZCR, PPTI, F, MJ | 90.5% | 57.5% |
| SE, ZCR, PPTI, F, MJ | 90.5% | 57.5% |
| MA, SE, ZCR, PPTI, F, MJ | 90.5% | 57.5% |
| D, PPTI, F, MJ | 90.4% | 57.7% |
| MA, D, PPTI, F, MJ | 90.4% | 57.7% |
| D, SE, PPTI, F, MJ | 90.4% | 57.7% |
| D, ZCR, PPTI, F, MJ | 90.4% | 57.7% |
| MA, D, SE, PPTI, F, MJ | 90.4% | 57.7% |
| MA, D, ZCR, PPTI, F, MJ | 90.4% | 57.7% |
| D, SE, ZCR, PPTI, F, MJ | 90.4% | 57.7% |

FIGURE 13

Table 10: MLR Top 20 Identification Metric Combination Scores Layer Two Assuming an Unknown Location

| L1 Metrics | L2 Metrics | Classification Accuracy | Identification Accuracy |
|---|---|---|---|
| MA, SE | MA, SE, ZCR, F, MJ | 94.8% | 77.4% |
| MA, SE | MA, ZCR, F, MJ | 94.8% | 77.3% |
| MA, SE | SE, ZCR, F, MJ | 94.8% | 77.1% |
| MA, SE | ZCR, F, MJ | 94.8% | 77.1% |
| MA, SE | D, ZCR, F, MJ | 94.8% | 76.3% |
| MA, SE | MA, D, ZCR, F, MJ | 94.8% | 76.3% |
| MA, SE | MA, F, MJ | 94.8% | 76.2% |
| MA, SE | MA, D, SE, ZCR, F, MJ | 94.8% | 76.2% |
| MA, SE | F, MJ | 94.8% | 76.2% |
| MA, SE | SE, F, MJ | 94.8% | 76.2% |
| MA, SE | MA, SE, F, MJ | 94.8% | 76.1% |
| MA, SE | D, SE, ZCR, F, MJ | 94.8% | 76.1% |
| MA, SE | D, F, MJ | 94.8% | 75.6% |
| MA, SE | MA, D, F, MJ | 94.8% | 75.5% |
| MA, D, SE | MA, SE, ZCR, F, MJ | 92.7% | 75.4% |
| MA, D, SE | MA, ZCR, F, MJ | 92.7% | 75.3% |
| MA, SE | D, SE, F, MJ | 94.8% | 75.3% |
| MA, SE | MA, D, SE, F, MJ | 94.8% | 75.3% |
| MA, SE, ZCR | MA, SE, ZCR, F, MJ | 92.1% | 75.1% |
| MA, D, SE | SE, ZCR, F, MJ | 92.7% | 75.1% |

FIGURE 14

Table 11: SVM Top 9 Classification Metric Combination Scores for Layer One Assuming an Unknown Location and Sensor

| Metrics | Classification Accuracy | Identification Accuracy |
|---|---|---|
| MA, SE | 96.1% | 62.2% |
| MA, D, SE, ZCR | 95.3% | 68.8% |
| MA, D, SE | 95.1% | 65.2% |
| MA, D, ZCR | 94.0% | 67.9% |
| MA, SE, ZCR | 93.3% | 67.4% |
| MA, D | 91.9% | 62.0% |
| D, SE, ZCR | 91.0% | 63.2% |
| MA, D, SE, ZCR, PPTI | 91.0% | 59.6% |
| MA, D, ZCR, PPTI | 90.4% | 58.9% |

FIGURE 15

Table 12: SVM Top 20 Classification Metric Combination Scores for Layer Two Assuming an Unknown Location and Sensor

| L1 Metrics | L2 Metrics | Classification Accuracy | Identification Accuracy |
|---|---|---|---|
| MA, D, SE, ZCR | MA, D, SE, ZCR | 95.3% | 68.4% |
| MA, SE | MA, D, SE, ZCR | 96.1% | 68.3% |
| MA, D, SE | MA, D, SE, ZCR | 95.1% | 67.8% |
| MA, SE | MA, SE, ZCR | 96.1% | 67.6% |
| MA, SE | MA, D, ZCR | 96.1% | 67.6% |
| MA, D, SE, ZCR | MA, D, ZCR | 95.3% | 67.6% |
| MA, D, ZCR | MA, D, SE, ZCR | 94.0% | 67.4% |
| MA, D, SE, ZCR | MA, SE, ZCR | 95.3% | 67.3% |
| MA, SE | SE, ZCR | 96.1% | 67.3% |
| MA, D, SE, ZCR | SE, ZCR | 95.3% | 67.1% |
| MA, D, SE | MA, D, ZCR | 95.1% | 67.1% |
| MA, D, SE | SE, ZCR | 95.1% | 66.8% |
| MA, D, SE | MA, SE, ZCR | 95.1% | 66.7% |
| MA, D, ZCR | MA, D, ZCR | 94.0% | 66.7% |
| MA, SE | D, SE, ZCR | 96.1% | 66.5% |
| MA, SE | MA, D, ZCR | 96.1% | 66.3% |
| MA, D, ZCR | SE, ZCR | 94.0% | 65.9% |
| MA, D, ZCR | MA, SE, ZCR | 94.0% | 65.9% |
| MA, SE, ZCR | MA, D, SE, ZCR | 93.3% | 65.9% |
| MA, D, SE, ZCR | MA, D | 95.3% | 65.9% |

FIGURE 16

Table 13: MLR Top 4 Classification Metric Combination Scores for Layer One Assuming an Unknown Location and Sensor

| Metrics | Classification Accuracy | Identification Accuracy |
|---|---|---|
| MA, SE, ZCR | 92.3% | 62.5% |
| MA, SE | 92.3% | 58.0% |
| MA, D, SE | 91.8% | 57.2% |
| MA, D, SE, ZCR | 91.5% | 58.1% |

FIGURE 17

Table 14: MLR Top 16 Identification Metric Combination Scores Layer Two Assuming an Unknown Location

| L1 Metrics | L2 Metrics | Classification Accuracy | Identification Accuracy |
|---|---|---|---|
| MA, SE | D, SE, ZCR, F, MJ | 92.3% | 73.0% |
| MA, SE | D, ZCR, F, MJ | 92.3% | 73.0% |
| MA, SE | MA, D, SE, ZCR, F, MJ | 92.3% | 73.0% |
| MA, SE | MA, D, ZCR, F, MJ | 92.3% | 72.9% |
| MA, SE, ZCR | D, SE, ZCR, F, MJ | 92.3% | 72.9% |
| MA, SE | MA, ZCR, F, MJ | 92.3% | 72.9% |
| MA, SE | MA, SE, ZCR, F, MJ | 92.3% | 72.9% |
| MA, SE | SE, ZCR, PPTI, F, MJ | 92.3% | 72.9% |
| MA, SE, ZCR | MA, ZCR, F, MJ | 92.3% | 72.9% |
| MA, SE, ZCR | D, ZCR, F, MJ | 92.3% | 72.9% |
| MA, SE, ZCR | MA, SE, ZCR, F, MJ | 92.3% | 72.9% |
| MA, SE, ZCR | MA, D, SE, ZCR, F, MJ | 92.3% | 72.9% |
| MA, SE, ZCR | MA, D, ZCR, F, MJ | 92.3% | 72.9% |
| MA, SE, ZCR | SE, ZCR, PPTI, F, MJ | 92.3% | 72.9% |
| MA, SE | D, F, MJ | 92.3% | 72.8% |
| MA, SE | ZCR, F, MJ | 92.3% | 72.8% |
| MA, SE | MA, D, F, MJ | 92.3% | 72.8% |
| MA, SE | D, SE, F, MJ | 92.3% | 72.8% |
| MA, SE | SE, ZCR, F, MJ | 92.3% | 72.8% |
| MA, SE | MA, D, SE, F, MJ | 92.3% | 72.8% |

FIGURE 18

Table 15: MLR Results Using NA (known location)

| No. Coeff. | Classification Accuracy | Identification Accuracy |
|---|---|---|
| 10 | 96.2% | 72.3% |
| 50 | 98.0% | 78.8% |
| 100 | 99.1% | 76.7% |
| 250 | 99.7% | 78.0% |
| 500 | 99.8% | 78.8% |
| 1653 | 99.8% | 78.6% |

FIGURE 19

Table 16: SVM Results Using NA (known location)

| No. Coeff. | Classification Accuracy | Identification Accuracy |
|---|---|---|
| 10 | 80.1% | 50.4% |
| 50 | 43.7% | 27.1% |
| 100 | 30.7% | 16.4% |
| 250 | 28.6% | 14.3% |
| 500 | 28.6% | 14.3% |
| 1653 | 28.6% | 14.3% |

FIGURE 20

Table 17: MLR Results Using NA (unknown location)

| No. Coeff. | Classification Accuracy | Identification Accuracy |
|---|---|---|
| 10 | 99.6% | 73.8% |
| 50 | 98.6% | 80.0% |
| 100 | 98.5% | 80.3% |
| 250 | 99.5% | 81.8% |
| 500 | 99.6% | 80.5% |
| 1653 | 99.6% | 81.6% |

FIGURE 21

Table 18: SVM Results Using NA (unknown location)

| No. Coeff. | Classification Accuracy | Identification Accuracy |
|---|---|---|
| 10 | 86.1% | 56.5% |
| 50 | 61.3% | 36.7% |
| 100 | 43.1% | 25.6% |
| 250 | 42.1% | 14.3% |
| 500 | 42.7% | 14.0% |
| 1653 | 28.5% | 14.3% |

FIGURE 22

Table 19: MLR Results Using NA (unknown location and sensor)

| No. Coeff | Classification Accuracy | Identification Accuracy |
|---|---|---|
| 10 | 94.9% | 60.6% |
| 50 | 97.9% | 73.1% |
| 100 | 98.1% | 78.0% |
| 250 | 96.6% | 73.8% |
| 500 | 97.9% | 75.0% |
| 1653 | 99.6% | 81.6% |

FIGURE 23

Table 20: SVM Results Using NA (unknown location and sensor)

| No. Coeff. | Classification Accuracy | Identification Accuracy |
|---|---|---|
| 10 | 84.8% | 54.6% |
| 50 | 51.4% | 32.4% |
| 100 | 37.1% | 19.3% |
| 250 | 29.7% | 14.3% |
| 500 | 28.7% | 14.3% |
| 1653 | 28.5% | 14.3% |

FIGURE 24

HUMAN ACTIVITY CLASSIFICATION AND IDENTIFICATION USING STRUCTURAL VIBRATIONS

BACKGROUND OF THE INVENTION

1) Field of the Invention

The present invention relates to sensing and categorizing impacts on a structure to determine what impacted the structure, i.e., classifying and/or identifying an action based on the vibrations caused in a structure by the action.

2) Description of Related Art

Numerous references disclose impact analysis to determine sources of impact, the type of material impacted, etc. For example, U.S. Pat. No. 3,759,085 discloses an impact sensor and coder apparatus for use in a materials-sorting system. A movable rigid body is adapted to strike individual pieces of the materials. An accelerometer associated with the rigid body measures the rate of deceleration of the rigid body, as a function of time, in terms of a voltage signal waveform. The waveform thus derived is compared with a group of typical waveforms to determine which of the waveforms of the group conforms most closely to that of the sample, thereby to identify the sample. (Abstract.) '085 attempts to determine the type of material being struck.

US 20170301207 discloses an impact detection methodology. Systems and methods can be utilized to detect impacts of concern such as collisions, falls, or other incidents. Systems and methods can be utilized to monitor an area and detect falls or collisions of an individual, for instance, as may require intervention to aid the subject. A system can include two or more accelerometers and a controller. The accelerometers can be in communication with the structure (e.g., within or on the walls or floor of a structure) and can monitor the structure for vibrations. The accelerometers can be coupled to a controller that is configured to process data obtained from the accelerometers and provide output with regard to the force and/or location of an impact within the structure. (Abstract.) The current disclosure differs significantly by first decomposing a vibration signal into various constants/parts and then a deep learning machine, machine learning classifier, or artificial intelligence algorithm is used to identify the action that caused the vibration rather than the force or location. In a sense, the '207 reference informs one of where and how hard something is touching you (e.g. on your arm with light pressure) and the current disclosure tells what it is touching you (e.g. pencil).

U.S. Pat. No. 9,827,935 discloses an apparatus that includes a center component defining a center chamber therein and first and second side components defining first and second chambers therein, respectively. The first and second side components are coupled to opposing ends of the center component with the first and second chambers in fluid communication with the center chamber. The center, first side and second side components are configured to extend substantially across a width of a vehicle. The apparatus further includes first, second and third pressure sensors in communication with the first, second and center chambers, respectively. (Abstract.) The current disclosure does not employ impact sensors.

U.S. Pat. No. 9,364,748 discloses an example system and method for detecting a moment of impact and/or strength of a swing based on moving a hand-held device including an accelerometer arrangement. A moment and a magnitude of simulated striking of the object are determined based on one or more accelerometer arrangement outputs resulting from the moving of the hand-held device. Using one or more of aural, visual and tactile outputs, the striking of the object is simulated in accordance with the determined moment of simulated striking and the determined magnitude of the simulated striking. (Abstract.) This disclosure does not identify impacts on a structure, nor identifying characteristics based on this identification.

U.S. Pat. No. 4,870,868 discloses a sensing device, which produces a response when the point of impact between an object and a member occurs at a preselected location on the member. When the member vibrates after being impacted by the object, an oscillatory electrical signal is produced by a piezoelectric sensor. Appropriate circuitry is provided for analyzing the oscillatory electrical signal and for producing a response if the object impacted the member at the preselected location. The sensing apparatus is particularly useful in athletics for determining whether a game object contacted the athletic instrument at its "sweet spot". (Abstract.) This disclosure does not employ localization techniques as explained in the current disclosure.

U.S. Pat. No. 9,489,777 discloses a device for detecting the impact of an object on a vehicle, which comprises a hose filled with a filling medium. The device also comprises a first pressure sensor which is connected with a first end of the hose and a second pressure sensor connected with a second end of the hose. An electronic control unit is connected with the first and the second pressure sensor and is designed for the processing of the signals received by the first and the second pressure sensor. The hose is sealed off with respect to the environment and the first and the second pressure sensor, so that the internal pressure of the filling medium is independent of an ambient pressure. The electronic control unit is designed for processing temperature-caused changes of the internal pressure as a criterion for the diagnosis of the operability of the device. (Abstract.) This disclosure does not identify impacts on a structure, nor identifying characteristics based on this identification.

U.S. Pat. No. 8,948,961 discloses a method and an apparatus for detecting a pedestrian impact, at least three acceleration sensors being provided which are respectively mounted on the inner side of the bumper cladding and each generate a signal. The pedestrian impact is detected as a function of a time offset between at least two of the three signals. The impact location is identified on the basis of the at least one time offset. (Abstract.) The current disclosure does not employ a time delay analysis.

U.S. Pat. No. 8,577,555 discloses an impact detection system with two chambers disposed adjacent to one another. The two chambers have opposing tapered shapes, so that an impact anywhere along them will create a different pressure wave or pulse in each chamber. A pressure sensor module incorporating two pressure sensors is disposed at one end of the dual-channel unit, and comparison of the signals from the sensors can be used to discriminate both the location and severity of a pedestrian impact. (Abstract.) This disclosure uses pressure sensors and a tapered design to locate impacts; the current disclosure does neither.

US 2017/0096117 discloses a method for determining an impact location of an object on a vehicle including reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time. Additionally, an interpolation point is calculated from the first sensor signal value and the second sensor signal value by using the sample value, at least one component of the interpolation point corresponding to the sample value. A time lag between an interpolation instant assigned to the interpolation point, and the third point in time takes place. Finally, the time lag is used for determining the impact location of the object. (Abstract.) The current disclosure does not employ time lag analysis.

CN106482638 relates to an electrical invention analyzing amplitudes and signal energies for electrical component analysis. This disclosure does not identify impacts on a structure, nor identifying characteristics based on this identification.

U.S. Pat. No. 9,453,759 discloses a system for determining vibration characteristics of a motor vehicle having a sensing arrangement adapted to sense vibrations of the vehicle or a vehicle part, and an electronic processing means adapted to apply an algorithm for evaluating signals from the sensing arrangement and for determining vibration characteristics based on the evaluation. The algorithm includes at least one support vector machine SVM (13 a . . . 13 g) adapted to output a probability that the current vibration characteristic belongs to a particular pre-set type of vibration characteristic. (Abstract.) This disclosure does not identify impacts on a structure, nor identifying characteristics based on this identification.

US 20150377694 discloses systems and methods for remotely detecting and assessing collision impacts using one or more acoustical sensors, such as using acoustical sensors to detect helmet collisions on an athletic playing field. For example, at least one acoustical sensor is disposed adjacent an athletic playing field and remotely from the one or more players on the athletic playing field. A processor of a computing device in communication with the acoustical sensor is configured for identifying whether the acoustical signal indicates a collision event occurred between a helmet and another object. The processor may also be configured for identifying a location on the playing field where the collision event occurred and/or identifying one or more characteristics of the acoustical signal to determine the amount of force, the duration, the speed, the acceleration, and/or the location of the collision event on the helmet. (Abstract.) The current disclosure does not employ acoustic analysis.

U.S. Pat. No. 7,430,914 discloses a vibration analyzing device for determining the vibrational response of a structural element, comprising: a vibration sensor for providing an output in response to a force input imparted to the structural element; processing means adapted to determine one of a plurality of classifications in response to the output, each classification corresponding to a condition of the structural element; and display means for displaying the determined classification. (Abstract.) This disclosure does not identify impacts on a structure, nor identifying characteristics based on this identification.

US20180018509 discloses an indoor person identification system that utilizes the capture and analysis of footstep induced structural vibrations. The system senses floor vibration and detects the signal induced by footsteps. Then the system extracts features from the signal that represent characteristics of each person's unique gait pattern. With these extracted features, the system conducts hierarchical classification at an individual step level and at a collection of consecutive steps level, achieving high degree of accuracy in the identification of individuals. (Abstract.) This disclosure does not identify impacts on a structure, nor identifying characteristics based on this identification. Further, the '509 reference they have to amplify the signal in order to obtain better results, we do not need amplification. Accordingly, it is an object of the present invention to sense, analyze, and categorize what caused impacts on a structure in order to categorize what impacted the structure.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4 shows Table 1, which displays a list of activity types for the experimental example.

FIG. 5 shows Table 2, which shows a classification and identification of types for the experimental example.

FIG. 6 shows Table 3, which shows Support Vector Machine (SVM) Top 22 Classification Metric Combination Scores (Layer One).

FIG. 7 shows Table 4, which shows SVM Top 22 Identification Metric Combination Scores (Layer Two).

FIG. 8 shows Table 5, which shows Multi-Logistic Regression (MLR) Top 22 Classification Metric Combination Scores (Layer One).

FIG. 9 shows Table 6, which shows MLR Top 22 Identification Metric Combination Scores (Layer Two).

FIG. 11 shows Table 7, which shows SVM Top 20 Classification Metric Combination Scores for Layer One Assuming an Unknown Location.

FIG. 12 shows Table 8, which shows SVM Top 20 Classification Metric Combinations Scores for Layer Two Assuming an Unknown Location.

FIG. 13 shows Table 9, which shows MLR Top 20 Classification Metric Combination Scores for Layer One Assuming an Unknown Location.

FIG. 14 shows Table 10, which shows MLR Top 20 Identification Metric Combination Scores Layer Two Assuming an Unknown Location.

FIG. 15 shows Table 11, which shows SVM Top 9 Classification Metric Combination Scores for Layer One Assuming an Unknown Location and Sensor.

FIG. 16 shows Table 12, which shows SVM Top 20 Classification Metric Combination Scores for Layer Two Assuming an Unknown Location and Sensor.

FIG. 17 shows Table 13, which shows MLR Top 4 Classification Metric Combination Scores for Layer One Assuming an Unknown Location and Sensor.

FIG. 18 shows Table 14, which shows MLR Top 16 Identification Metric Combination Scores Layer Two Assuming an Unknown Location.

FIG. 19 shows Table 15, which shows MLR Results Using Normalized Autocorrection (NA) (known location).

FIG. 20 shows Table 16, which shows SVM Results Using NA (known location).

FIG. 21 shows Table 17, which shows MLR Results Using NA (unknown location).

FIG. 22 shows Table 18, which shows SVM Results Using NA (unknown location).

FIG. 23 shows Table 19, which shows MLR Results Using NA (unknown location and sensor).

FIG. 24 shows Table 20, which shows SVM Results Using NA (unknown location and sensor).

Figure 1:
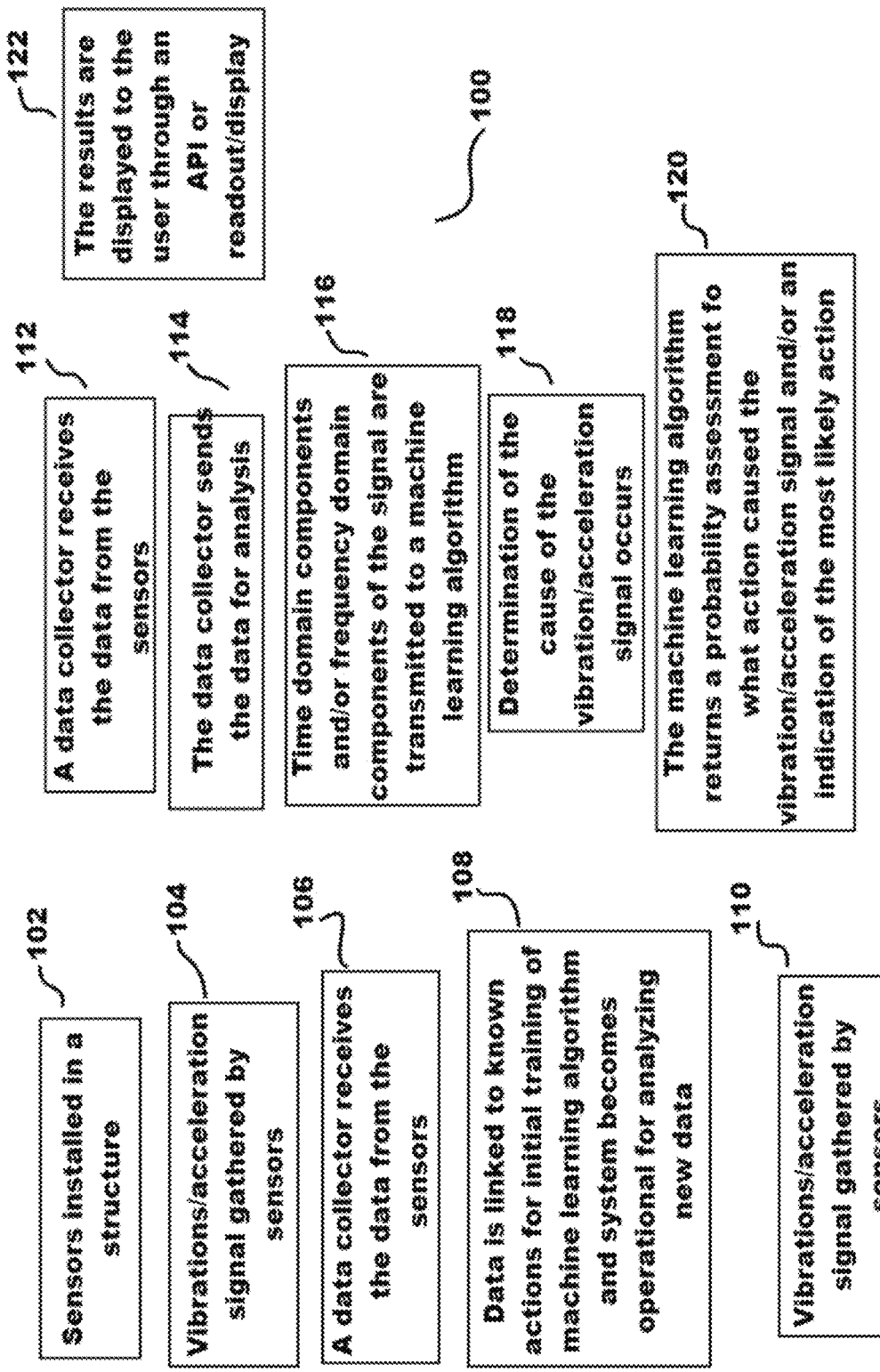
FIG. 1 shows an outline of one method of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

SUMMARY OF THE INVENTION

In one embodiment the current disclosure provides a system for categorizing actions based on vibrations. The system may include at least one sensor, at least one data collector that receives information from the at least one sensor, a processor analyzing a vibration signal obtained from the information received from the at least one sensor, wherein the processor determines time domain components and/or frequency domain components of the vibration signal, and a classifier that employs at least one algorithm to analyze the time domain components and/or frequency domain components of the vibration signal, wherein the classifier associates the time domain components and/or frequency domain components of the vibration signal with a known action. Further, the known action may comprise a form of human movement. Still further, the known action may comprise a form of movement other than human movement. Yet again, the at least one sensor may comprise an accelerometer. Still further, the time domain component may comprise maximum amplitude, zero-crossing rate, and/or duration and/or other time domain components known or known in the future to the practice. Yet still, the frequency domain components may comprise Fourier transform, discrete cosine transform, and/or power spectral density and/or other frequency domain components known or known in the future to the practice. Further, the classifier may provide a probability assessment that correlates the vibration signal to a known action within a predefined confidence level. Yet further, at least one machine learning or artificial intelligence may be employed to associate the time domain components and/or frequency domain components of the vibration signal with the known action. Further again, undesirable sound or vibration components may be removed from the vibration signal prior to the at least one algorithm being used to analyze the time domain components and/or frequency domain components of the vibration signal.

In an alternative embodiment, the disclosure provides a method for categorizing actions based on vibrations. The method may include detecting at least one vibration, converting the at least one vibration into information, obtaining at least one vibration signal from the information, determining time domain components and/or frequency domain components of the vibration signal, analyzing the time domain components and/or frequency domain components of the vibration signal, and associating the time domain components and/or frequency domain components of the vibration signal with a known action. Further, the known action may comprise a form of human movement. Still yet, the known action may comprise a form of movement other than human movement. Yet again, the at least one sensor may comprise an accelerometer. Further again, the time domain component may comprise maximum amplitude, zero-crossing rate, and/or duration. Furthermore, the frequency domain components may comprise Fourier transform, discrete cosine transform, and/or spectral power density and/or other frequency domain components known or known in the future to the practice. Still yet, the classifier may provide a probability assessment that correlates the vibration signal to a known action within a predefined confidence level. Again further, at least one machine learning or artificial intelligence may associate the time domain components and/or frequency domain components of the vibration signal with the known action. Still further, undesirable sound or vibration components may be removed from the vibration signal prior to the at least one algorithm being used to analyze the time domain components and/or frequency domain components of the vibration signal.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure is directed to classifying an action based on the vibrations caused in a structure by the action. This provides the ability to identify an action based on the vibration the action caused in/on/to the structure (e.g., building, vehicle, boat, plane, sidewalk, driveway, tower, etc.) where it occurred. With respect to FIG. 1, in one embodiment, a vibration analysis 100 may be conducted. At step 102, sensors may be installed anywhere in/on/nearby/around a structure where a vibration can be felt. Sensors may or may not be in direct contact with the surface, area, structure or feature from which the sensor detects vibrations. The sensor may be, in one instance, a vibration measuring sensor, including but not limited to a velocity sensor, a gyroscope sensor, a pressure or microphone sensor, a laser displacement sensor, a capacitive displacement or Eddy Current sensor, a vibration meter, a vibration data logger, or any other known or later developed sensor for measuring vibration. The location or origin of the vibration may be known or unknown with respect to this disclosure. At step 104, a signal, e.g., an acceleration or vibration of the structure, is gathered from installed sensors (e.g., LVDT, velocity sensor, displacement sensor, microphone, strain gauge, gyroscope, pressure, capacitive displacement, vibration meter, accelerometer, etc.). The sensors are connected to a data collector, e.g. data acquisition device whether that is a standalone card, other computer of some sort, or other way to gather data from a sensor. At step 106, the data collector takes data from the sensors. The data may be sensor agnostic such as, but not being limited to, voltage, analog, digital, numeric, strings, dates, times, booleans, arrays, and any other data types/forms known or known in the future to the practice. At step 108, data is linked to known actions for initial training of the deep learning, machine learning, and/or artificial intelligence algorithm and the system becomes operational for analyzing new data. For purposes of example only and not intended to be limiting, a known action may comprise any action where a human, non-human (such as animals and/or natural phenomena), or object (such as a ball, wheelchair, cane, walker, chair, etc.) interacts with a structure. This may be a form of human movement, such as a person talking, humming, playing an instrument, taking footsteps, a person falling, a person bathing, a person dressing, a person walking, a person eating, a person showering, a person bathing, a person coughing, a person sneezing, a person toileting, a person changing position from bed to standing, a person moving from sitting to standing, and a person moving about by any manner a person may move or ambulate including using a walker, wheelchair, rollator, cane or other device to aid ambulation, a person squatting, a person jumping, a person exercising, or in other instances an object falling, an object rolling across a surface, an object moving across a surface, etc., or machines vibrating a surface, machines moving along a surface, machines hitting the surface, machines interacting with the surface, etc. or an explosion, or still further naturally occur phenomenon, an object bouncing along a surface, or still further a pet or animal walking, jumping, falling, etc., or any happening that may cause a structure to vibrate, with respect to a surface or feature, as well as combinations of the above. At 110, vibrations/accelerations/movements are again gathered by sensors. At 112, a data collector receives the data from the sensors. At step 114, the data collector sends the data for analysis. A data collector may be an Omega Data Acquisition System, Keysight Data Acquisition System, HBM Data Acquisition System, National Instruments Data Acquisition System, DATAQ Data Acquisition System, CAS Dataloggers Data Acquisition System, or any data acquisition system known or known in the future to the practice. A data collector may also be a Lenovo computer, HP computer, Asus computer, Dell computer, Acer computer, server, or other device known or known in the future to the practice, A sensor may be piezoelectric, micro-electrical mechanical system, velocity sensors, displacement sensors, accelerometers, Memsic sensors, TE Connectivity Vibration sensors, PCB Piezotronics sensors, Mouser vibration sensors, Colibrys vibration sensors, National Instruments vibration sensors, SKF vibration sensors, Bosch vibration sensors PCE Instruments vibration sensors, or any other vibration sensor known or known in the future to the practice.

Analytics (e.g. part or all of the deep learning, machine learning, and/or artificial intelligence algorithms operation, preprocessing, postprocessing, event-of-interest detection, etc) may be performed on either the data collector or some other device, e.g., a server or other computer, and sensor signals may be pre-processed with techniques known or known in the future to the practice (e.g. detrending, frequency filters, smoothing filters, peak isolation, blind signal separation, independent component analysis, noise cancelling, normalization, auto-scaling, derivatives, tessellating, curve fitting, windowing, standard deviation, variance, mean, outlier removal). At step 116, the analytical portion takes time domain components known or known in the future to the practice (e.g., amplitude, magnitude, zero-crossing rate, duration, jerk, proportional peak index, threshold-crossing rate, signal energy, shape, autocorrelation, signal-to-noise ratio, sampling rate, range, autocorrelation, cross correlation, maxima, minima, mean, standard deviation, variance) and/or frequency domain components known to or known in the future to the practice (e.g. Fourier transform, Fourier series, discrete cosine transform, Laplace transform, Z transform, wavelet transform, power spectral density, frequency spectrum, amplitude, magnitude, phase, bandwith, standard deviation, variance, mean, frequency, spectrogram, cross power spectral density, maxima, minima) of an acceleration signal and sends this to a machine learning algorithm (e.g. support vector machine). At step 116, time domain components and/or frequency domain components of the signal are transmitted to a deep learning, machine learning, and/or artificial intelligence algorithm known to the practice such as supervised, semi-supervised, unsupervised, reinforcement-learning algorithms that may include Linear Models, Linear and Quadratic Discriminant Analysis, Kernel Ridge Regression, Support Vector Machines, Stochastic Gradient Descent, Nearest Neighbors, Gaussian Processes, Naive Bayes, Cross Decomposition, Decision Trees, Ensemble Methods, Neural Networks, Clustering, Association Rules, Q-Learning, Temporal Difference, Deep Adversarial Networks, and/or other algorithms known or known in the future to the practice. At step 118, a determination of the cause of the vibration/acceleration/movement signal occurs. To wit, take components of the signal in time and/or frequency domain of single or multiple signals of single or multiple recorded actions. These are fed to the deep learning, machine learning, and/or artificial intelligence algorithm with their action linked, if supervised or partially linked if semi-supervised, with the resulting signal components so the algorithm learns what components are linked to what action. At step 120, the machine learning portion returns a probability assessment that the previously trained actions were what caused the vibration. If using a machine learning algorithm that is unsupervised is employed, vibrations will be placed into groups of similar signal components by the unsupervised algorithm without any prior labeling. These groups can later be connected to actions by feeding signal components of a known action and seeing where the algorithm groups the known action, or simply knowing which of the unlabeled vibrations belongs to which action. The signals can be grouped as their components may be similar but the algorithm would not be able to label the action on its own. The action could be later "labeled" by introducing known action's signals at the algorithm and seeing what group of signals it is put with and then label the action that way. The result can be post-processed with methods known or known in the future to the practice (e.g. providing pre-defined confidence levels, ignoring results that do not meet a certain criteria, etc.), probability cutoff point, outlier removal). This provides the percent chance (aka confidence) that the identified action is actually the action, sets a threshold for confidence for the result to be considered the result or otherwise reports "unknown", outlier removal, and may apply another additional deep learning, machine learning, or artificial intelligence layers to further refine results. At step 122, the results may be relayed to a user through an API, a readout/display, or other ways to provide output known or will be known to the practice.

Systems of the current disclosure may use one or more rounds of analysis, each round may use the same classifier (e.g. deep learning, machine learning, artificial intelligence algorithm), different classifier, or any combination thereof to analyze the vibration(s) and determine the action(s) that caused it. Each round can be used to determine different classifications (e.g. categorizations) of the vibrations.

A layering technique entitled Cascading Decision Layers (CDL), was born to help facilitate differentiation of vibration events. Each layer has a goal, and each subsequent layer uses the analysis of the previous to further narrow the scope of the event potentiality. A rating, based in probabilistic outputs from a decision engine, is used to indicate the event type options the following layer should use. This is similar in approach to how a SVM classifier decides between classifications, however, SVMs use one-to-one comparisons. CDL in contrast uses a one-to-selected-many method where an event's features are compared to multiple possible events. With each layer, a probability is generated so statistical overall ratings of likelihood can be developed to give to a user the chance the CDL thinks the event has been identified correctly.

Figure 2:
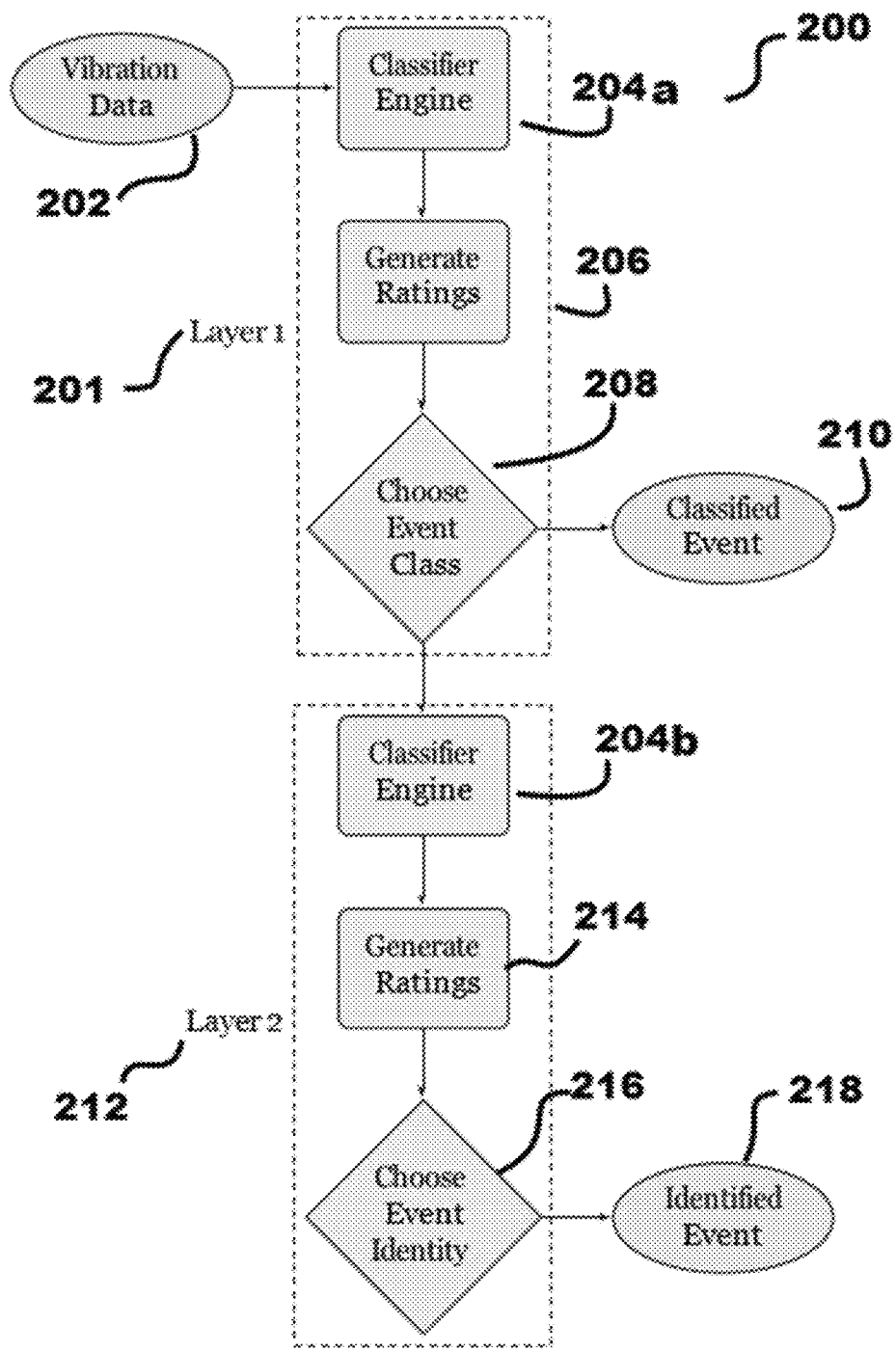
FIG. 2 shows a two Cascading Decision Layer (CDL) example of the current disclosure.

One may have any number of layers depending on the amount of refinement needed. The important thing to remember is to give each layer an obtainable goal. For example, two layers are used in the research presented here. The first layer's goal is to classify a vibration event from a large array of options into a group. The second layer then is used to further refine the classification so the identification of a more specific action can occur based on the results of the first layer. Considering there are only three classifications and either two or three possible identification types per classification, this is a reasonable amount of layers. In one embodiment, classifications may be chosen by the user and do not have a methodology besides classification in a group or general term (e.g., ball, car) and identification is the specific (e.g., basketball, sedan). Generally, similar objects or actions would be classified together if they are alike physically or have similar impact vibration patterns. Then the more specific label within the group would be the identification. CDL is a method for layering deep learning, machine learning, and/or artificial intelligence algorithms so it can be an unlimited number of layers. This is demonstrated in FIG. 2, which demonstrates a two CDL example 200. To initiate first layer analysis 201, vibration data 202 (or movement or acceleration data, etc.) is introduced to first layer 201 via providing vibration data 202 to a classifier 204a, which in turn generates ratings 206. Ratings 206 are used to select an event class 208 and in turn generate a classified event 210 wherein vibration data 202 is narrowed into a smaller group of potential events. The selection of an event class by ratings can be done using any methods known or known in the future to the practice, including but not limited to, threshold cutoff where a defined rating is used to choose the classes to continue or simply taking the top two rated classes. To initiate second layer analysis 212, classified event 210, which may in the form of data, is fed again into classifier 204 b, which may be an entirely different classifier, if 204 b is a different classifier, the second classifier (deep learning, machine learning, or artificial intelligence algorithm) can be either the same type of classifier (e.g. SVM, MLR) that was trained using only a limited set of data (chosen based on results of the first layer) or a different (either using a subset of training data based on the previous layer or the full set). This in turn generates ratings 214, which consist of percent confidence that the event is one of the identified options. Ratings 214 are then used to choose event identity 216, which in turn produces identified event 218. In the last layer, the highest scoring even identity is typically taken as the identified event, though other techniques known to the practice may be used including reporting confidence to the user.

The duration of an event is defined to be the time it takes for the signal to return to rest conditions. In an application scenario, the signal's rest conditions are defined to be when the sensor is reading data below a threshold level. This is due to the fact that the sensor itself cannot physically read a zero value. Equation 1, below, calculates the duration of the event where N is the number of points in the signal window, II ( ) is the indicator function where its value is one if the condition is true and zero if not, n is the location within the signal, S is the signal, T is the threshold level, and fs is the frequency of sampling used to capture the signal. Force was calculated using the Force Estimation and Event Localization (FEEL) algorithm.

$$D = \frac{\sum_{n=0}^{N} II(S_n > T)}{f_s} \qquad (1)$$

A simple feature of signal is its maximum amplitude. The thinking being that the maximum amplitude may be of use to help differentiate between types of categorization groups. In other words, it stands to reason that the amplitude of an object dropped from a high elevation will be larger than that of an object dropped from a low elevation simply because there is more energy when the object impacts. Equation 2 calculates the maximum amplitude where max( ) is the maximum value function, and S is the signal.

$$A_{max} = \max(|S|) \qquad (2)$$

Jerk is the rate of change of acceleration. Here the maximum value of the jerk vector is taken in Equation 3 where max( ) is the maximum value function, and S(t) is the acceleration signal with respect to time t. By being a direct derivative of the acceleration signal, information is directly embedded in the resulting vector that is potentially useful for human activity recognition.

$$MJ = \max\left(\frac{dS(t)}{dt}\right) \quad (3)$$

Signal Energy, in a signal processing sense, describes the amount of activity present in a signal. Multiple actions may result in similar energy values, however, this metric has been used in past research to differentiate human activity types and thus was included for thoroughness. See Yaniv Zigel, Dima Litvak, and Israel Gannot. "A Method for Automatic Fall Detection of Elderly People using Floor Vibrations and Sound-Proof of Concept on Human Mimicking Doll Falls". In: *IEEE Transactions on Biomedical Engineering* (2009), which is hereby incorporated by reference.

The sum of squares was used to calculate signal energy as seen in Equation 4 where N is the number of points in the signal window, and S(t) is the acceleration signal with respect to time t.

$$E_s = \int_0^N |S(t)|^2 dt \quad (4)$$

Zero Crossing Rate (ZCR) measures the rate a signal crosses the zero threshold (i.e. sign changes) and has been used extensively in speech recognition. The zero crossing rate was included as seen in Equation 5 where N is the number of points in the signal, M( ) is the indicator function where its value is one if the condition is true and zero if not, S is the signal itself, and n is the position within the signal.

$$ZCR = \frac{1}{N-1}\sum_{n=1}^{N-1} H(S_n S_{n-1} < 0) \quad (5)$$

Proportional Peak Time Index (PPTI), see below at Equation 6, creates proportions to the maximum amplitude within a signal (refer to 0054). The integral of the proportion curve generated by using the following equation where a is a ratio between 0 and 1 of the maximum amplitude, and η( ) is the fall time defined as the time between the maximum amplitude and the last sample that is above a times the amplitude. Refer to Madarshahian, Ramin, and Juan M. Caicedo. "Human Activity Recognition Using Multinomial Logistic Regression." Model Validation and Uncertainty Quantification, Volume 3. Springer, Cham, 2015. 363-372, for more information.

$$PPTI = \int_{\alpha=0}^{\alpha=1} \eta(\alpha) d\alpha \quad (6)$$

Experimental Setup. This research used the Human Activity Benchmark dataset provided by the University of South Carolina's Structural Dynamics and Intelligent Infrastructure (SDII) Laboratory, and developed by Diego Arocha. See, Diego Arocha. "Time Domain Methods to Study Human-Structure Interaction". Master of Science. University of South Carolina, 2013, which is hereby incorporated by reference along with Madarshahian, Ramin, Juan M. Caicedo, and Diego Arocha Zambrana. "Benchmark problem for human activity identification using floor vibrations." Expert Systems with Applications 62 (2016): 263-272, which is hereby incorporated by reference.

Figure 3:
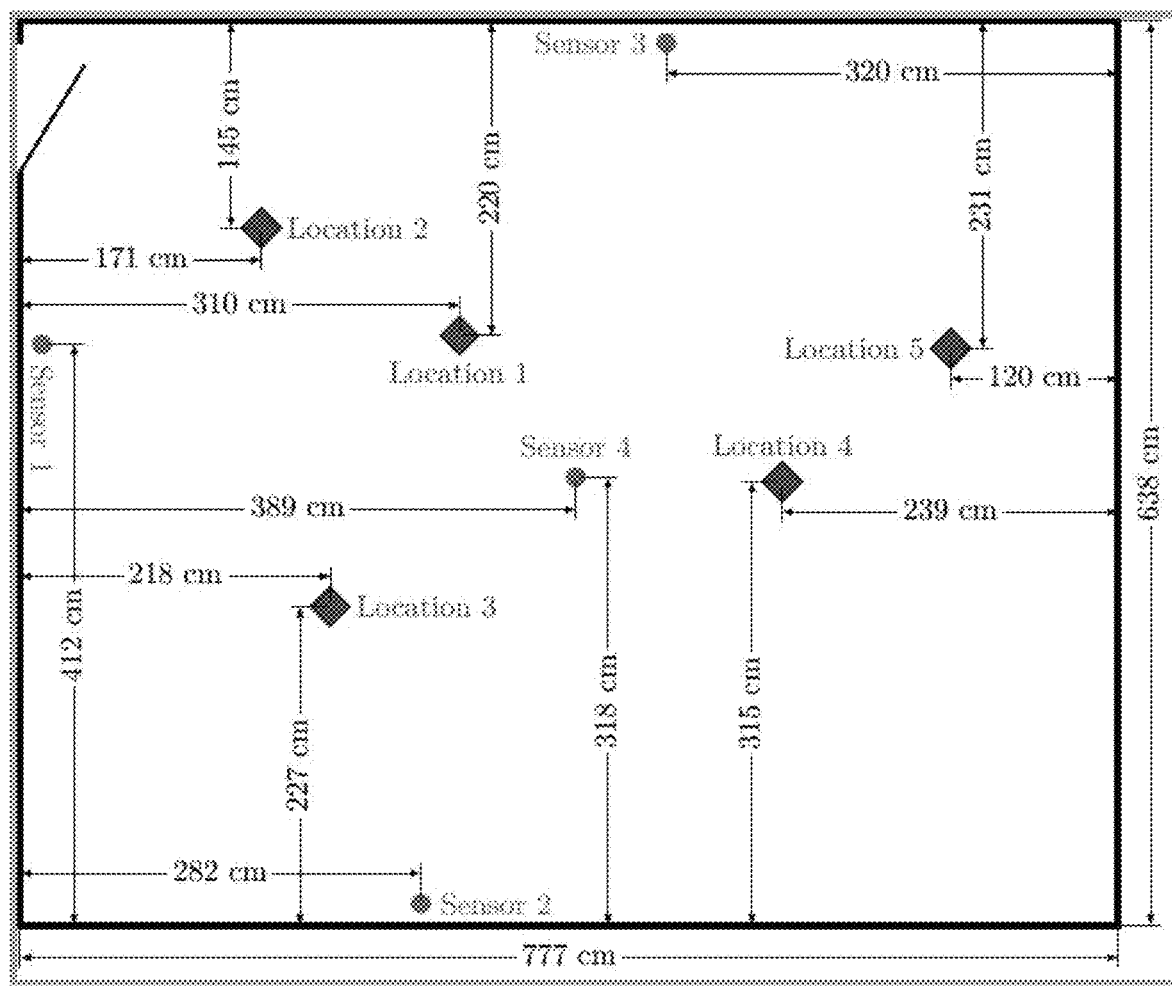
FIG. 3 shows one embodiment of an experimental layout of the current disclosure.

The experiments were performed in the second story office of the University of South Carolina's (USC) Structures Laboratory, measuring 777 cm (25.5 ft) by 638 cm (20.9 ft), that has reinforced concrete floors covered in vinyl tiles. Sensors with sensitivity of 1000 mV/g were installed, with three being on the floor near the walls and one being in the center of the room. The sensors were connected to a data acquisition card, such as a NI CompactDAQ with a NI9234 module. Data was collected at a rate of 1651.7 Hz with 2 s windows. FIG. 3 shows the Concrete Floor Experimental Layout.

A total of 120 records are available for each activity type, described in Table 1, see FIG. 4, for each location for a grand total of 4200 records, but five outlier signals were removed from each type leaving 115 records a piece. The abbreviations are as follows: Baglow→Bag of K'NEX dropped from 1.42 m (4.63 ft); Baghigh→Bag of K'NEX dropped from 2.1 m (6.89 ft); Balllow→Basketball dropped from 1.42 m (4.63 ft); Ballhigh→Basketball dropped from 2.1 m (6.89 ft); Djump→Person D jumping (name left out for privacy); Jjump→Person J jumping; Wjump→person W jumping. The records were split into training (15 records) and testing (100 records). The activity types are grouped by classification, or general group (e.g. jump), and identification, or the specific action (e.g. djump). The groupings are presented in Table 2, see FIG. 5.

Based on the assumption that the location of impact is known, perhaps using the FEEL Algorithm, each sensor could have a specific classifier for each location generated using the training dataset. The sensors would operate in a multi-agent fashion as put forth in, Benjamin T. Davis et al. "Use of Wireless Smart Sensors for Detecting Human Falls through Structural Vibrations". In: *Civil Engineering Topics*. Ed. by Tom Proulx. Vol. 4. Springer, 2011, pp. 383-389, which is hereby incorporated by reference, allowing each sensor to make a decision based on its own set of parameters embodied through the metrics.

In layer one, each agent would generate probabilities that one of seven activity types occurred for each record of the testing dataset. Next, the sensors would confer with one another and average their probabilities together by activity type. The highest probability would then be considered the action classification.

Layer two would take the activity classification from layer one, and perform an additional analysis based solely on the identification types present in the activity classification. The same probabilistic procedure as layer one would be performed to determine the action identification. However, in other embodiments, the method may be flexible so another deep learning, machine learning, or artificial intelligence algorithm could be used for each layer or different metrics used in each layer.

All 127 unique combinations of metrics, i.e., all possible permutations of the seven metrics used in the example, with metric order ignored, are attempted in an effort to determine the best combination. The second layer would only consider those combinations whose classification scores where 90% or above, as anything lower is considered to be an ineffective combination. In other words, layer one would use those metrics passing the cut off and layer two would use all 127 metrics in comparison with the layer one choices. Furthermore, a sensitivity analysis was performed to explore how sensitive machine-learning is to each of the metrics.

There were 22 metric combinations having 90% classification accuracy or above on layer one, giving rise to 2794 possible combinations between the two layers. Table 3, see FIG. 6, shows the accuracy results for the top 22 combinations, with the best in each accuracy category highlighted.

Layer two for the SVM only improved identification accuracy by 0.1% when comparing to the best identification accuracy in each layer. The combination MA, SE, and ZCR shows up 17 times in the top 22 layer two combinations, and in each instance, increases the identification accuracy. It even increased its own identification accuracy from layer one to take the top identification score in both layers. Table 4, see FIG. 7, gives the top 22 identification scores for the second layer of the SVM.

There were 46 metric combinations having 90% classification accuracy or above on layer one, giving rise to 2116 possible combinations between the two layers. Table 5, see FIG. 8, shows the accuracy results for the top 22 combinations, with the best in each accuracy category highlighted.

Layer two for the MLR classifier showed some improvement in identification accuracy, having a 5% increase over the best of layer one. Table 6, see FIG. 9, presents the scores for the top 22 combinations in identification accuracy. The top identification score is highlighted.

A deeper look past trying each metric combination separately leads to a sensitivity analysis. Tree-Based Feature Selection was chosen to evaluate the sensitivity of the machine-learning to the various metrics explored, see Pierre Geurts, Damien Ernst, and Louis Whenkel. "Extremely Randomized Trees". In: Machine Learning 63 (2006), pp. 3-42. doi: 10.1007/s10994-006-6226-1 and Cecille Freeman, Dana Kulic, and Otman Basir. "Feature-Selected Tree-Based Classification". In: IEEE Transactions on Cybernetics 43.6 (December 2013), pp. 1990-2004. doi: 10.1109/TSMCB.2012.2237394, which are hereby incorporated by reference, with the Python Scikit-Learn module providing the functionality, see Scikit-Learn. September 2015. url: http://scikit-learn.org/stable/index.html, which is also hereby incorporated by reference. Each event classification was looked at separately to determine what metrics describe each action best, and then all the event classifications were looked together to get an overall set of metrics for human activity classification and identification. Importance factors were calculated to describe how well the metric captures variability of the dataset. Each location was considered separately, keeping in line with the assumption that the location is known at the time of impact, and then the importance factors averaged together.

Figure 10:
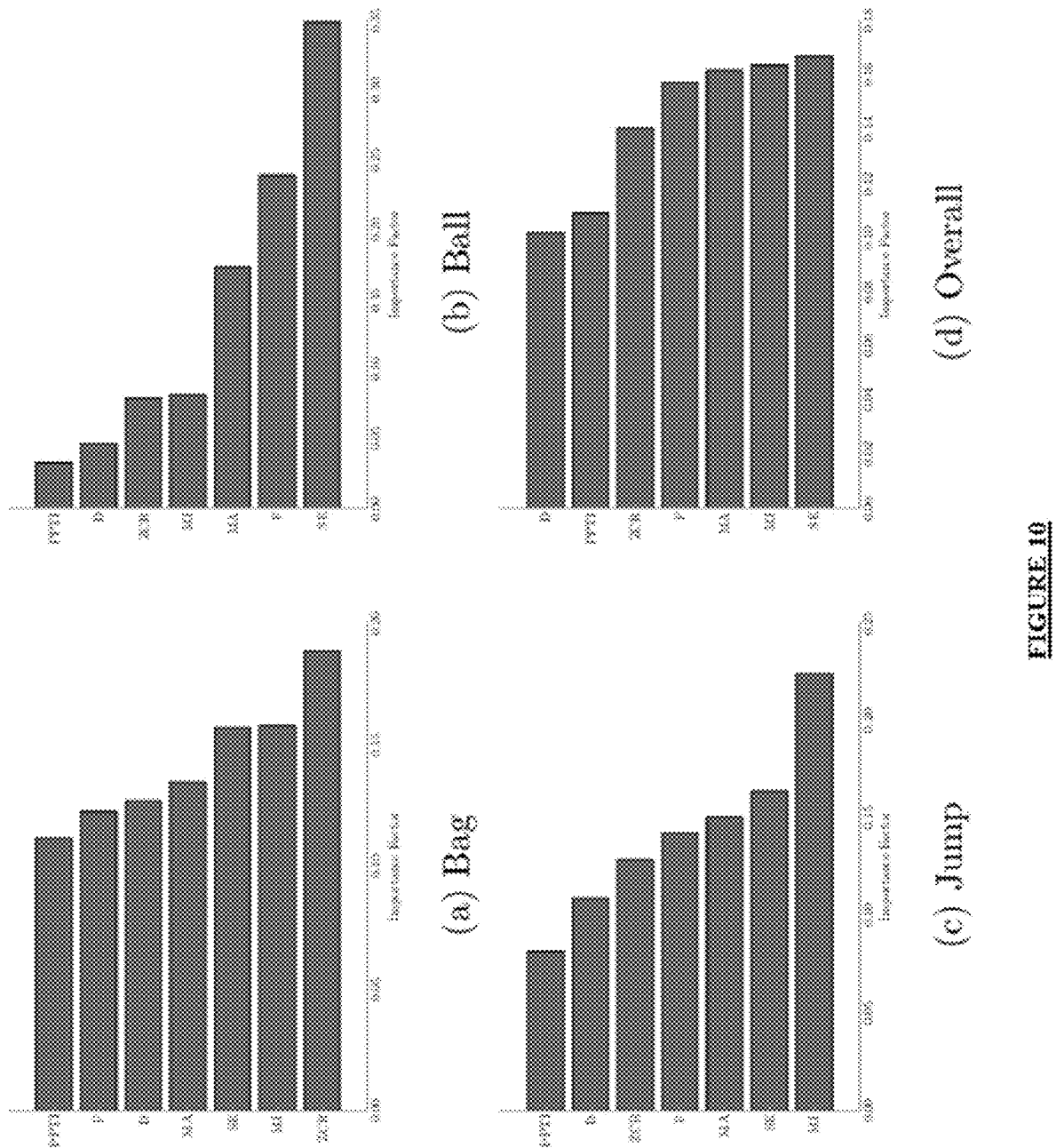
FIG. 10 shows metric sensitivity of various activities.

Interestingly, Signal Energy was in the top three of importance for all cases looked at, which shows in the results for both the MLR and SVM discussed earlier. Maximum Jerk and Maximum Amplitude appear in the top three for three of the four cases, with Zero Crossing Rate and Force filling in the rest of the top three gaps. The results from attempting each unique combination match well with the results of the independent sensitivity study presented in FIG. 10. The metrics of more importance tend to show up in the top 22 more often than those of lower importance, showing good agreement with the aforementioned results.

The current disclosure also explored an unknown location trial. This trial used the same methodology as above, however, the location was assumed to be unknown, thus adding another variable. The purpose was to see if the technique could work in a more general sense, thus allowing a sensor to be installed without having to be calibrated for location. Numerous benefits arise from this ability including ease of installation and sensor calibration, which would make activity monitoring using structural vibrations a more practical approach.

There were 16 metric combinations having 90% classification accuracy or above on layer one, giving rise to 2032 possible combinations between the two layers. Table 7, see FIG. 11, shows the accuracy results for the top 20 combinations, with the best in each accuracy category highlighted. Table 8 is shown at FIG. 12.

Identification accuracy increased by 2.1% when comparing the best identification accuracies between layer one and layer two. Only four metrics appear in the top twenty of layer two, and they also appear in layer one predominantly: duration, maximum amplitude, signal energy, and zero crossing rate. Similar to the results for the known location trial, these metrics describe the shape of the impact which, in a way, is like the fingerprint of the signal. The top scores are highlighted.

There were 22 metric combinations having 90% classification accuracy or above on layer one, giving rise to 484 possible combinations between the two layers. Table 9, see FIG. 13, shows the accuracy results for the top 20 combinations, with the best in each accuracy category highlighted.

Layer two for the MLR classifier showed some improvement in identification accuracy, having a 11.0% increase over the best of layer one. Table 10, see FIG. 14, presents the scores for the top 20 combinations in identification accuracy. The top identification score is highlighted. FIG. 15 shows Table 11, which shows SVM Top 9 Classification Metric Combination Scores for Layer One Assuming an Unknown Location and Sensor and FIG. 16 shows Table 12, which shows SVM Top 20 Classification Metric Combination Scores for Layer Two Assuming an Unknown Location and Sensor.

The metric combination of maximum amplitude and signal energy for layer one, and varying metric combinations for layer two show a very consistent trend of increasing identification accuracy from layer one by about 10%. The same goes for using maximum amplitude, duration, and signal energy for layer one, with the second layer consistently increasing identification accuracy by about 13.7%.

The current disclosure also conducted an unknown location and sensor trial. This trial used the same methodology as the unknown location trial above, however, each sensor used the same machine learning model that was trained using all the training records from each location. There were 9 metric combinations having 90% classification accuracy or above on layer one, giving rise to 1143 possible combinations between the two layers.

There were 4 metric combinations having 90% classification accuracy or above on layer one, giving rise to 508 possible combinations between the two layers. Table 13, see FIG. 17, shows the accuracy results for the top combinations. Table 14, see FIG. 18, shows MLR Top 16 Identification Metric Combination Scores Layer Two Assuming an Unknown Location.

The following section provides an example of only using a signal analysis/decomposition algorithm known to the practice and then using its result coefficients/points straight with a machine learning algorithm for determining an event. Autocorrelations are tools for finding repeating patterns of a signal, even in the presence of noise. Actions, and objects, are distinguishable by the vibration pattern they induce, hence, autocorrelations are naturally included for their pattern finding properties, see Benjamin T. Davis et al. "Use of Wireless Smart Sensors for Detecting Human Falls through Structural Vibrations". In: *Civil Engineering Topics*. Ed. by Tom Proulx. Vol. 4. Springer, 2011, pp. 383-389, which is hereby incorporated by reference. Equation 7 shows the autocorrelation calculation of a discrete signal where t is the time, N is the signal length, x is the signal, and t is the time displacement (i.e. time lag), see Julius S. Bendat and Allan G. Piersol. *Random Data: Analysis and Measurement Procedures.* 3rd ed. John Wiley and Sons, Inc., 2000, which is hereby incorporated by reference.

$$R_{xx}(\tau) = \sum_{t=0}^{N} x(t)x(t+\tau) \quad (7)$$

For the purposes of this research, the autocorrelations are normalized using Equation 8 where Rxx is the autocorrelation, μ is the mean of the autocorrelation, and σ is the standard deviation of the autocorrelation. This helps signals with like patterns to match more closely in magnitude, which in turn aids in improving deep learning, machine learning, or artificial intelligence's technique's accuracy technique's accuracy, as they work not only on the order of values but the magnitudes as well.

$$R_{xx,norm} = \frac{R_{xx} - \mu}{\sigma} \quad (8)$$

This research used the Human Activity Benchmark dataset provided by the University of South Carolina's Structural Dynamics and Intelligent Infrastructure (SDII) Laboratory, and developed by Diego Arocha, see Diego Arocha. "Time Domain Methods to Study Human-Structure Interaction". Master of Science. University of South Carolina, 2013, which is hereby incorporated by reference.

The experiments were performed in the second story office of the University of South Carolina's (USC) Structures Laboratory, measuring 777 cm (25.5 ft) by 638 cm (20.9 ft), that has reinforced concrete floors covered in vinyl tiles. PCB 333B50 accelerometers with sensitivity of 1000 mV/g were installed, with three being on the floor near the walls and one being in the center of the room. The sensors were connected to a NI CompactDAQ with a NI9234 module. Data was collected at a rate of 1651.7 Hz with 2 s windows. FIG. 3 shows the experimental layout.

A total of 120 records are available for each activity type, described in Table 1, see FIG. 4, for each location for a grand total of 4200 records, but five outlier signals were removed from each type leaving 115 records a piece. The records were split into training (15 records) and testing (100 records). The activity types are grouped by classification, or general group (e.g. jump), and identification, or the specific action (e.g. djump). The groupings are presented in Table 2, see FIG. 5.

The Normalized Autocorrelation (NA) of each signal for each sensor was taken, assuming the location of each impact is known. Only half of the autocorrelation was considered (1653 coefficients) as the curve is naturally symmetric about the midpoint. SVM and MLR techniques were applied considering various numbers of autocorrelation coefficients counting from the origin onward, resulting in machine learning functions for each sensor for each location. The layering technique CDL was not used in conjunction with the NA as it would be redundant, and would not increase accuracy. However, using other metrics in a second layer could improve accuracy as seen in the CDL example.

Overwhelmingly, MLR demonstrates superior capability to use normalized autocorrelations for classification and identification, staying above 96% and 72% regardless of the number of coefficients, respectively. The SVM method, by comparison, begins with 80.1% accuracy in classification and 50.4% accuracy in identification for ten coefficients considered, but deteriorates rapidly as the number of coefficients increases. This is due to how each technique "learns." MLR attempts to make a logistic function that generates probabilities that are then used for classifying new events, whereas SVM creates hyperplanes that group provided data and makes decisions based on similarity to "learned" patterns. By normalizing the autocorrelation coefficients, the magnitude becomes less important and the shape of the curve takes on greater importance.

The number of coefficients needed for near perfect classification accuracy is less than that of Discrete Cosine Transforms (DCT), but still larger the amount of values needed by the CDL using combination of individual metrics to get high accuracy. However, the autocorrelation of a signal is quick computationally, and, given that using MLR with NA offers 99.8% classification accuracy, the highest of any method explored, and competitively high accuracy in identification of 78.8%, the number of coefficients could considered unimportant.

Tables 15 and 16, see FIGS. 19-20, present the results for the MLR and SVM using NA, respectively, with the highest score highlighted for each category.

The trial discussed above for Normalized Autocorrelations (known location) was repeated, except this time it was assumed that the location of each impact was unknown. Results for MLR presented in Table 17, see FIG. 21, and Table 18, see FIG. 22, for SVM. MLR performed significantly better than the SVM, tending to increase classification and identification accuracy with increasing number of normalized autocorrelation coefficients considered whereas the SVM decreased. The classification and identification accuracy of the SVM performed best with ten coefficients, yet, the MLR classifier did significantly better with the same number of coefficients having 13.5% better classification accuracy and 17.3% better identification accuracy.

The trial presented above for Normalized Autocorrelations (unknown location) was repeated with a slight change. All training records for the five locations were used to generate one machine learning model. Next, each sensor used the same model to make predictions of what each event was. Table 19, see FIG. 23, shows MLR Results Using NA (unknown location and sensor). Table 20, see FIG. 24, shows: SVM Results Using NA (unknown location and sensor).

An example execution is described in the following. First, sensors are placed through an area to monitor, attached to the structure anywhere vibrations can be felt. Existing vibration data with associated action labels of what caused the vibrations is then used, in conjunction with any of the techniques mentioned within, to train a machine learning classifier. Alternatively, new data can be collected using the installed sensors by performing actions within the structure, connecting the action labels to the data, and then training the machine learning classifier. The sensors then monitor vibrations within the structure. The incoming vibrations can be analyzed by the machine learning algorithm in real time to identify what action caused the vibrations or recorded data can later be analyzed after the fact.

In a further embodiment, sensor data may have undesirable signal components, i.e. "noise", removed before being provided to the deep learning, machine learning, or artificial intelligence algorithm. One example of this is through application of Spectral Subtraction with Half-Wave Rectification methods. If one takes a signal comprised of a desired component and an undesired component of the form:

$$w_{signal} = w_{desired} + w_{noise}$$

where $w_{signal}$ is the composite signal containing the desired component $w_{desired}$ and the undesired noise component $w_{noise}$. If $w_{noise}$ is known, then $w_{desired}$ may be obtained using Spectral Subtraction with Half-Wave Rectification as in $$\|\hat{f}_{desired}\| = \begin{cases} \|\hat{f}_{signal}\| > \|\hat{f}_{noise}\| & \|\hat{f}_{signal}\| - \|\hat{f}_{noise}\| \\ \text{else} & 0 \end{cases}$$

where $\hat{f}_{desired}$ is the Discrete Fourier Transform of $w_{desired}$, $\hat{f}_{signal}$ is the Discrete Fourier Transform of $w_{signal}$, and $\hat{f}_{noise}$ is the Discrete Fourier Transform of $w_{noise}$. The symbol $\| \|$ indicates absolute value of the vector. The phase of $\hat{f}_{signal}$ is then used to obtain $w_{desired}$.

$$\hat{f}_{desired,i} = |\hat{f}_{desired}|_i \times [\cos(\Phi_{signal,i}) + \sin(\Phi_{signal,i}) \times j]$$

where $\Phi_{signal}$ is the is the phase of $w_{signal}$ obtained from $\hat{f}_{signal}$, and i is the index of the vector.

Figure 25:
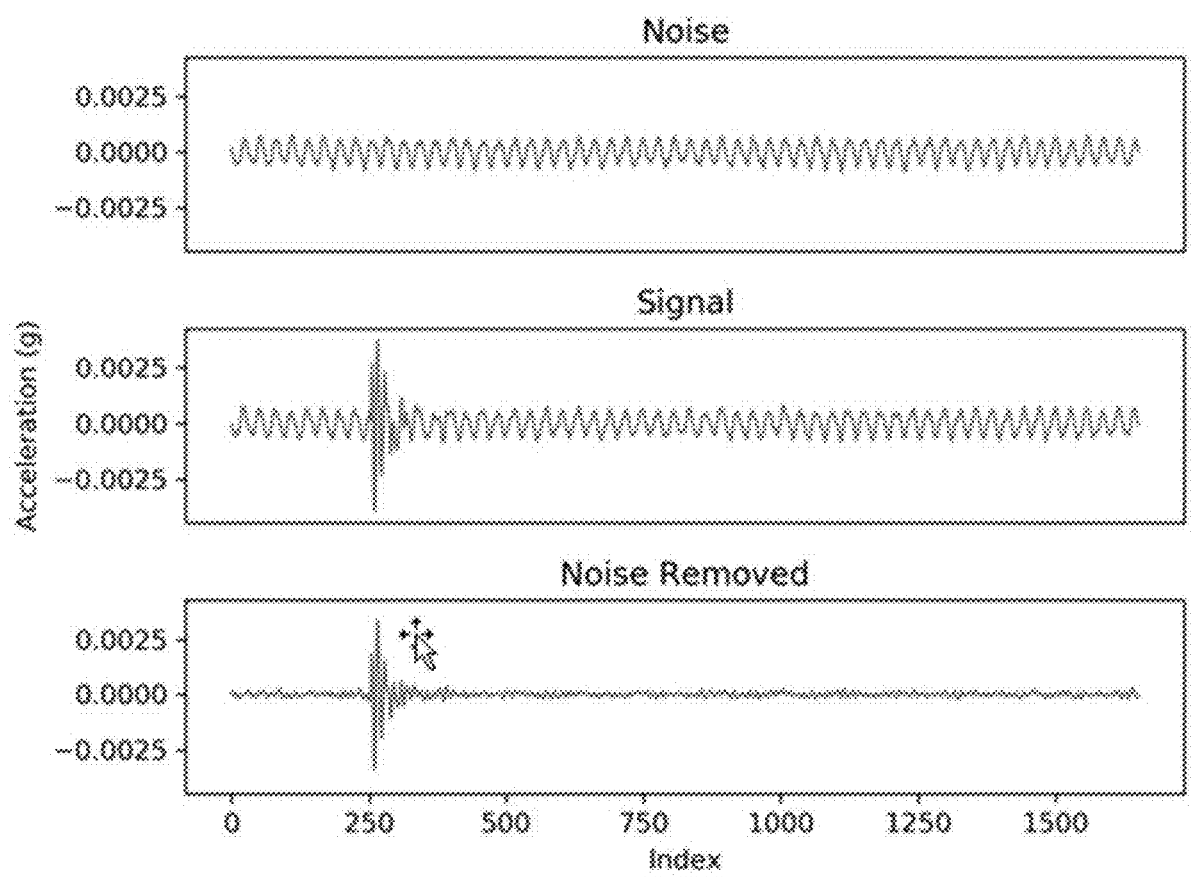
FIG. 25 shows Sensor 1's noise removal.
Figure 26:
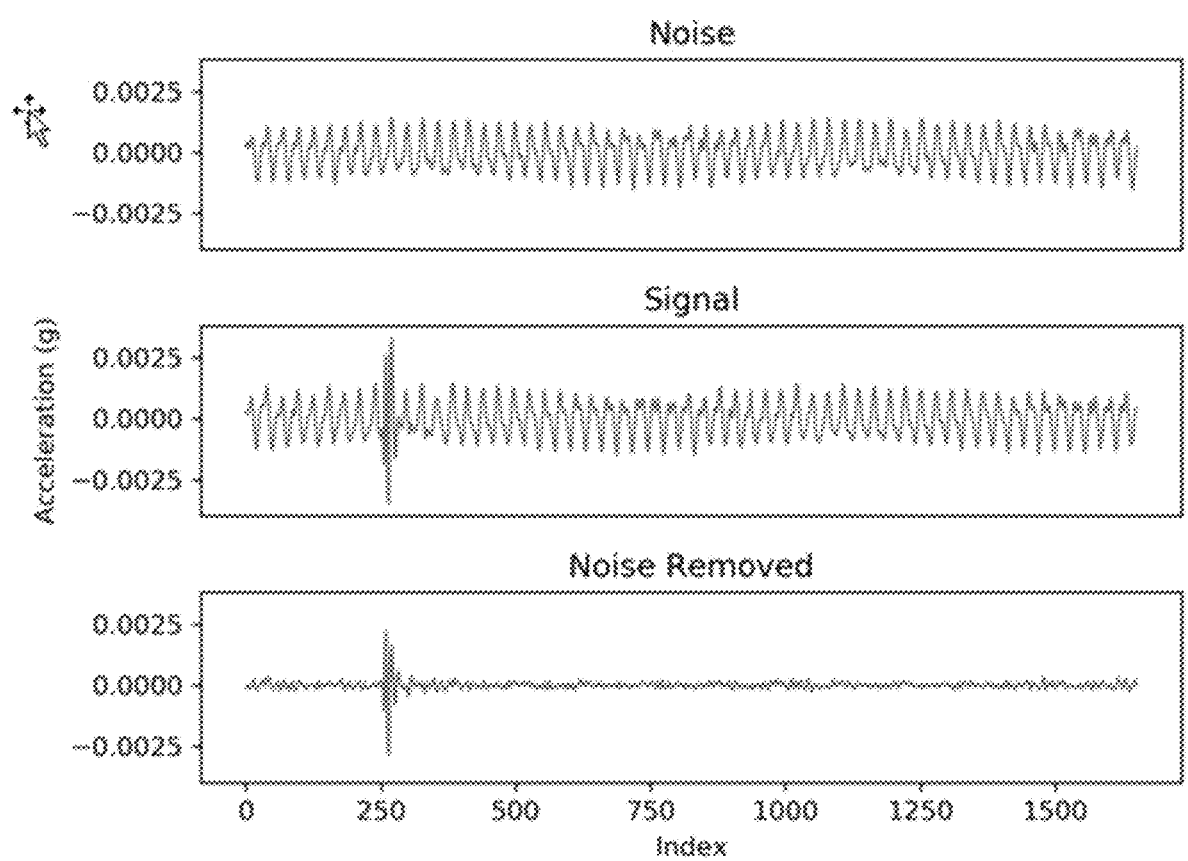
FIG. 26 shows Sensor 2's noise removal.
Figure 27:
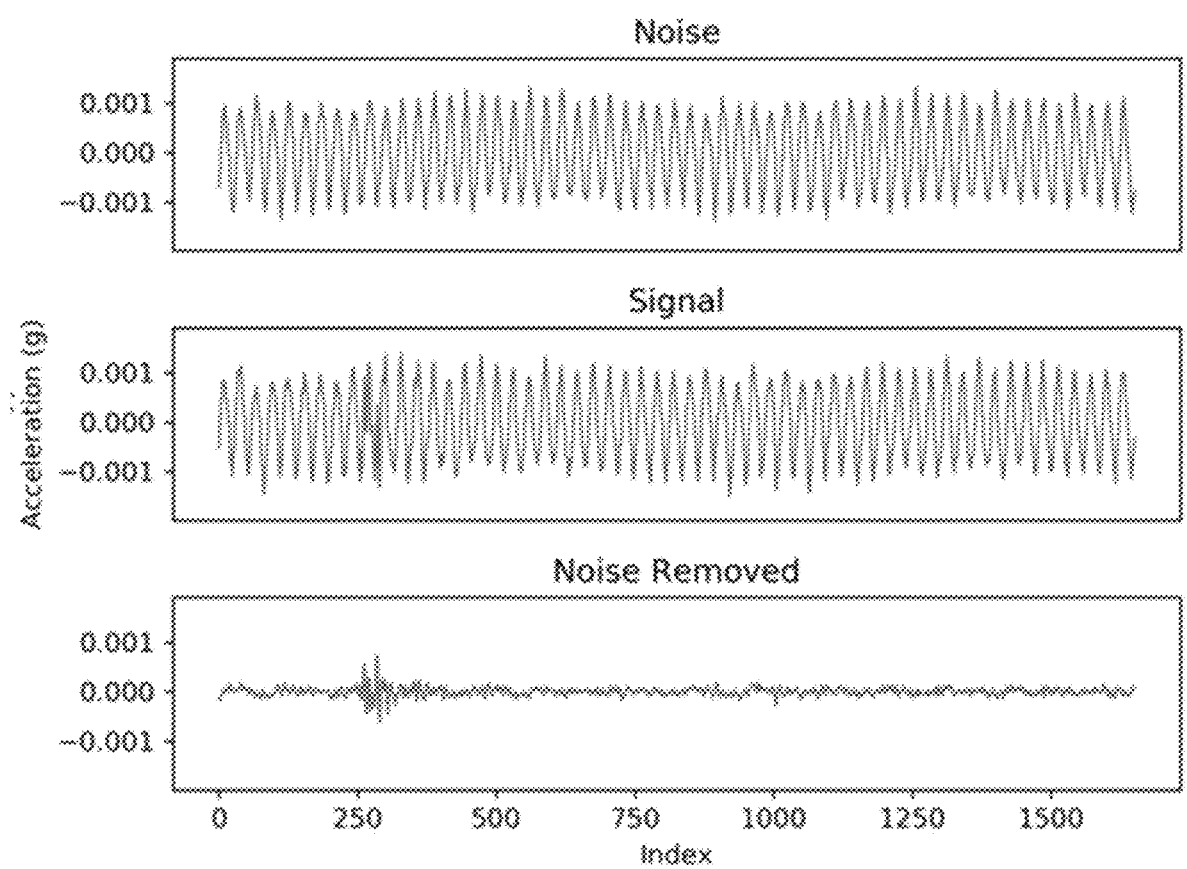
FIG. 27 shows Sensor 3's noise removal.

The method described above was applied to 540 individual recordings of three accelerometers' data totaling 2 seconds in length for tennis ball drops varying in height from 7 in to 35 in in 18 different locations above a floor. The accelerometers were placed randomly throughout the 10 ft by 15 ft room. A dehumidifier was running, creating noise in the floor in one corner, near two of the accelerometers. In an example of a preferred embodiment, the one second of signal just before the time of the tennis ball impact was used as $w_{noise}$. Note that any length of $w_{noise}$ signal may be used to clean any length of $w_{signal}$, the two do not have to be the same length. FIGS. 25, 26 and 27 show examples of noise just before the signal of interest, the signal of interest, and the desired signal after applying the aforementioned method for each of the three accelerometers.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A system for classifying human actions based on vibrations comprising:
    at least one accelerometer for sensing structural vibrations in a structure, wherein an only sensor for sensing the structural vibrations in the structure is the at least one accelerometer measuring accelerations less than 20 kHz;
    at least one data collector that receives information from the at least one accelerometer wherein noise components are removed from the information;
    a processor analyzing a vibration signal obtained from the information received from the at least one accelerometer, wherein the processor determines time domain components and/or frequency domain components of the vibration signal; and
    a classifier that employs at least one algorithm to analyze the time domain components and/or the frequency domain components of the vibration signal, wherein the classifier associates the time domain components and/or the frequency domain components of the vibration signal with a known action to identify and determine the known action caused by at least one human action based on only the vibration signal detected only by the at least one accelerometer, wherein the at least one accelerometer detects the accelerations of the structure caused by the structural vibrations to classify whether the at least one human action is not an object, machine, or animal causing the structural vibrations and is a human action selected from a group consisting of a person falling, bathing, dressing, walking, eating, showering, coughing, wheezing, toileting, changing position from bed to standing, changing position from sitting to standing, ambulating, using a walker, using a wheelchair, using a rollator, using a cane, squatting, jumping, and/or exercising, which generated the vibration signal; and
    wherein at least a first layering technique and at least a second layering technique are employed to identify and determine the known action and the first layering technique and the second layering technique comprise different layering techniques and are selected from a group including deep learning, machine learning, at least one artificial intelligence algorithm, and/or combinations of the above.

2. The system of claim 1, wherein the time domain components comprise amplitude, zero-crossing rate, and/or duration.

3. The system of claim 1, wherein the frequency domain components comprise Fourier transform, discrete cosine transform, and/or power density.

4. The system of claim 1, wherein the classifier provides a probability assessment that correlates the vibration signal to the known action within a predefined confidence level.

5. The system of claim 1, wherein at least one of the machine learning or the at least one artificial intelligence algorithm associates the time domain components and/or the frequency domain components of the vibration signal with the known action.

6. The system of claim 1, wherein sound or vibration components are processed from the vibration signal prior to the at least one algorithm being used to analyze the time domain components and/or the frequency domain components of the vibration signal.

7. The system of claim 1, wherein the first layering technique creates a classification of the vibration signal and the second layering technique further refines the classification to identify and determine the known action.

8. A method for categorizing actions based on vibrations comprising:
    detecting at least one vibration in a structure wherein an only sensor for sensing structural vibrations in the structure is at least one accelerometer measuring accelerations less than 20 kHz;
    converting the at least one vibration into information wherein noise components are removed from the information;
    obtaining at least one vibration signal from the information;
    determining time domain components and/or frequency domain components of the at least one vibration signal;

analyzing the time domain components and/or the frequency domain components of the at least one vibration signal; and associating the time domain components and/or the frequency domain components of the at least one vibration signal with a known action to identify and determine the known action caused by human, non-human, and object actions based only on the at least one vibration signal to classify whether at least one human action generated the vibration signal to classify whether the at least one human action is not an object, machine, or animal causing the structural vibrations and is a human action selected from the group consisting of a person talking, humming, playing an instrument, taking footsteps, falling, bathing, dressing, walking, eating, showering, coughing, sneezing, toileting, changing position from bed to standing, changing position from sitting to standing, moving, ambulating, using a walker, using a wheelchair, using a rollator, using a cane, squatting, jumping, and/or exercising, which generated the at least one vibration signal; and employing at least a first layering technique and a second layering technique to identify and determine the known action, wherein the first layering technique and the second layering technique comprise different layering techniques and are selected from a group including deep learning, machine learning, artificial intelligence algorithm, and/or combinations of the above.

9. The method of claim 8, wherein the time domain components comprise maximum amplitude, zero-crossing rate, and/or duration.

10. The method of claim 8, wherein the frequency domain components comprise Fourier transform, discrete cosine transform, and/or power density.

11. The method of claim 8, wherein the classifier provides a probability assessment that correlates the at least one vibration signal to the known action within a predefined confidence level.

12. The method of claim 8, wherein at least one of the machine learning, the deep learning, or the artificial intelligence algorithm associates the time domain components and/or the frequency domain components of the at least one vibration signal with the known action.

13. The method of claim 8, wherein sound or vibration components are processed from the at least one vibration signal prior to at least one algorithm being used to analyze the time domain components and/or the frequency domain components of the at least one vibration signal.

14. The method of claim 8, further comprising creating a classification of the at least one vibration signal via the first layering technique and refining the classification to identify and determine the known action via the second layering technique.

* * * * *